US007752676B2

(12) United States Patent
Hartung et al.

(10) Patent No.: US 7,752,676 B2
(45) Date of Patent: Jul. 6, 2010

(54) ENCRYPTION OF DATA IN STORAGE SYSTEMS

(75) Inventors: Michael Howard Hartung, Tucson, AZ (US); Yu-Cheng Hsu, Tucson, AZ (US); Robert Frederic Kern, Otter Rock, OR (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 11/406,661

(22) Filed: Apr. 18, 2006

(65) Prior Publication Data

US 2007/0256142 A1 Nov. 1, 2007

(51) Int. Cl.
H04L 9/32 (2006.01)
G06F 11/30 (2006.01)
G06F 7/04 (2006.01)
G06F 17/30 (2006.01)

(52) U.S. Cl. .......................... 726/28; 726/26; 713/165; 713/191; 713/193

(58) Field of Classification Search ................. 726/28, 726/26; 713/165, 191, 193
See application file for complete search history.

(56) References Cited

U.S. PATENT DOCUMENTS

| 4,493,028 | A | | 1/1985 | Heath | |
| 5,577,125 | A | * | 11/1996 | Salahshour et al. | 380/54 |
| 5,889,860 | A | * | 3/1999 | Eller et al. | 705/51 |
| 5,991,753 | A | | 11/1999 | Wilde | |
| 6,789,195 | B1 | * | 9/2004 | Prihoda et al. | 713/182 |
| 7,107,461 | B2 | * | 9/2006 | Magoshi | 713/193 |
| 2001/0037462 | A1 | * | 11/2001 | Bengtson | 713/201 |
| 2002/0004784 | A1 | | 1/2002 | Forbes et al. | |
| 2002/0040432 | A1 | * | 4/2002 | Gao | 713/170 |
| 2002/0184495 | A1 | * | 12/2002 | Torii et al. | 713/160 |
| 2003/0002067 | A1 | * | 1/2003 | Miyano | 358/1.14 |
| 2003/0088783 | A1 | | 5/2003 | DiPierro | |
| 2003/0154372 | A1 | | 8/2003 | Barszcz | |
| 2003/0217281 | A1 | * | 11/2003 | Ryan | 713/200 |
| 2003/0233549 | A1 | * | 12/2003 | Hatakeyama et al. | 713/170 |
| 2004/0010701 | A1 | * | 1/2004 | Umebayashi et al. | 713/193 |
| 2004/0059912 | A1 | | 3/2004 | Zizzi | |
| 2004/0107342 | A1 | | 6/2004 | Pham et al. | |
| 2004/0172538 | A1 | | 9/2004 | Satoh et al. | |
| 2004/0230792 | A1 | * | 11/2004 | McCarty | 713/153 |

(Continued)

FOREIGN PATENT DOCUMENTS

EP 1 486 864 A2 12/2004

OTHER PUBLICATIONS

Fu, Kevin E. "Group Sharing and Random Access in Cryptographic Storage File Systems", 1998.*

(Continued)

Primary Examiner—Michael J Simitoski
(74) Attorney, Agent, or Firm—Rabindranath Dutta; Konrad Raynes & Victor LLP

(57) ABSTRACT

Provided are a method, system and article of manufacture, wherein a request to access data is received from a requestor. A determination is made as to whether the requestor is authorized to access the data. In response to determining that the requestor is authorized to access the data, a determination is made as to whether the data is encrypted. An encryption key is requested from the requester, in response to determining that the data is not encrypted.

18 Claims, 5 Drawing Sheets

U.S. PATENT DOCUMENTS

2005/0081048 A1    4/2005  Komaria et al.
2005/0204154 A1*   9/2005  Osaki .......................... 713/193
2007/0124601 A1*   5/2007  Singh et al. ................. 713/189

OTHER PUBLICATIONS

EPO Communication pursuant to Article 94(3) EPC dated Feb. 18, 2009 for Application No. 07 727 453.8-1245 IBM.

PCT International Search Report & Written Opinion dated Jul. 30, 2007 for application No. PCT/EP2007/052981 filed Mar. 28, 2007.

Response to EPO Communication pursuant to Article 94(3) EPC dated Jun. 5, 2009 for Application No. 07 727 453.8-1245 IBM.

China Office Action dated Oct. 16, 2009 for Application No. 200780011519.8 filed Mar. 28, 2007.

* cited by examiner

ENCRYPTION OF DATA IN STORAGE SYSTEMS

BACKGROUND

1. Field

The disclosure relates to a method, system, and article of manufacture for the encryption of data in storage systems.

2. Background

In many computational environments, data is stored in one or more data centers that may be accessed by hosts and other computational devices over one or more networks. The hosts may read, write and perform other operations on the data stored in the data centers.

Data Security may be necessary both within and outside the data centers, and in many situations data security may be provided by encrypting the data. For example, data stored in storage subsystems included in the data centers may be encrypted. Additionally, the storage subsystems included in the data centers may encrypt data when transmitting the data from the data centers to the hosts over the network. Furthermore, data transmitted from a host to the data centers may be encrypted by software on the host when the host communicates with the storage subsystems included in the data centers.

SUMMARY OF THE DESCRIBED EMBODIMENTS

Provided are a method, system and article of manufacture, wherein a request to access data is received from a requestor. A determination is made as to whether the requester is authorized to access the data. In response to determining that the requestor is authorized to access the data, a determination is made as to whether the data is encrypted. An encryption key is requested from the requester, in response to determining that the data is not encrypted.

In certain embodiments, the encryption key is received from the requester. The data is encrypted by using the encryption key. The requestor is allowed to access the data.

In certain additional embodiments, a decryption key is requested, in response to subsequent requests for accessing the data.

In further embodiments, the request to access the data is made by addressing a logical unit, a file, a byte, a record, a block, a volume or an entire subsystem that includes the data.

In still further embodiments, the data is legacy data that is stored in a storage unit, wherein the legacy data is maintained in an unencrypted state at least until the time an attempt is made to access the legacy data, and wherein data that is not legacy data is maintained in an encrypted state in the storage unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In many situations, it may be necessary to provide security to data in a computing environment in which storage subsystems included in data centers are already being used, and the storage subsystems have stored unencrypted data. For example, security issues may exist with tens of thousands of petabytes of data already stored unencrypted on disk, tape, cd-rom, and other storage media on the storage subsystems. The pre-existing data stored unencrypted in the storage subsystems of the data centers may be referred to as legacy data.

It can take a considerable amount of time (days, weeks, months, years) to encrypt and rewrite all the legacy data that has been stored unencrypted in the storage subsystems of the data centers. In certain situations, security issues may remain exposed until the operation to encrypt all unencrypted legacy data is completed.

Certain embodiments provide "immediate encryption" for unencrypted legacy data stored in storage subsystems, even when the pre-existing unencrypted legacy data has not been converted to encrypted data within the storage subsystems. Immediate encryption is provided to a storage subsystem for all data configured behind that storage subsystem, by providing a logical encryption layer between an application that is attempting to access the data and the storage subsystem that is providing the data. Immediate encryption permits a migration step for customers with unencrypted data stored in storage subsystems, by allowing the storage subsystems to encrypt all unencrypted data over an extended period of time, while providing many of the benefits of encryption immediately when data is accessed from the storage subsystems.

Figure 1:
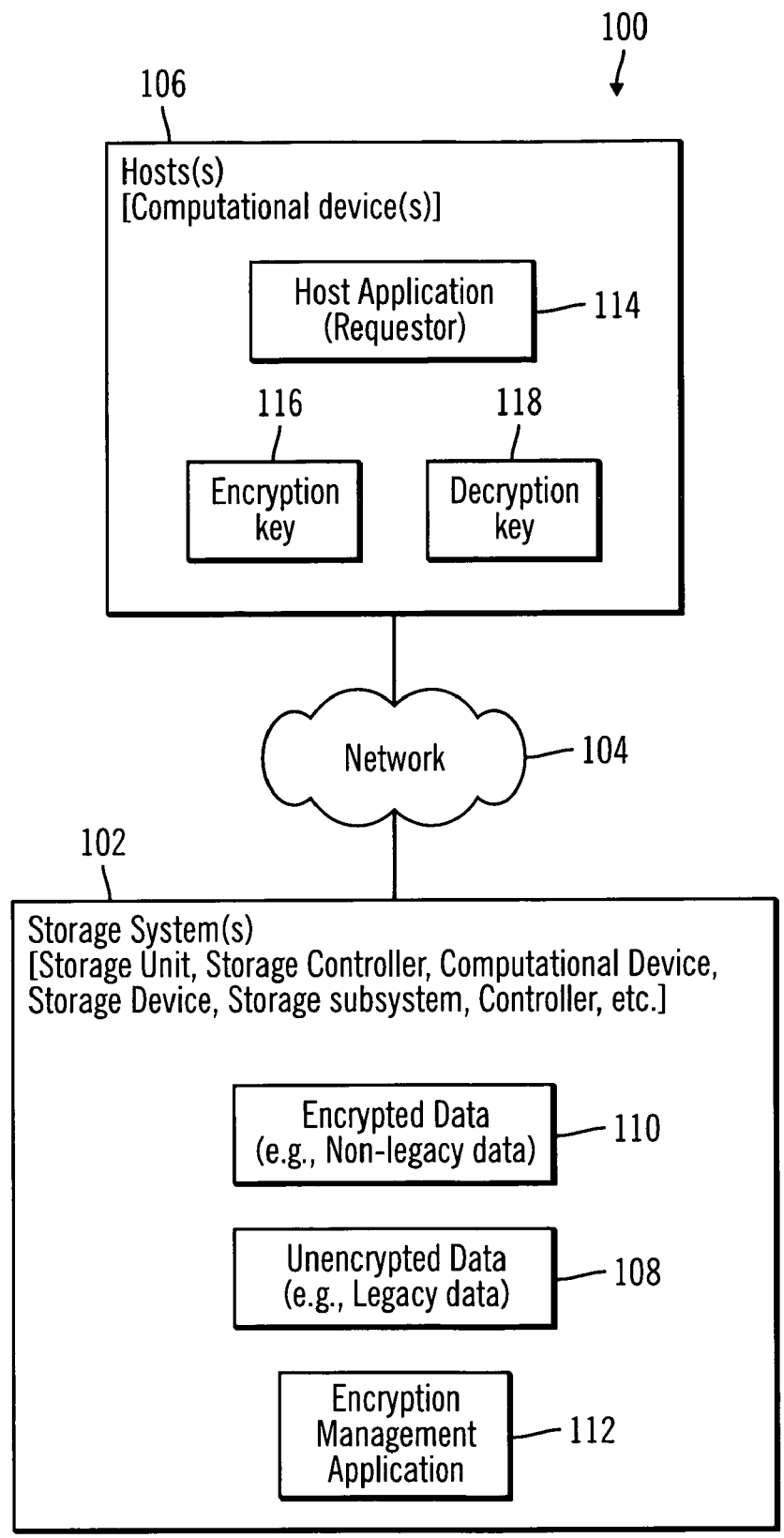
FIG. 1 illustrates a block diagram of a computing environment that includes a storage system with encrypted legacy data and unencrypted non-legacy data, in accordance with certain embodiments.

FIG. 1 illustrates a block diagram of a computing environment 100 in accordance with certain embodiments. At least one storage system 102 is coupled via a network 104 to one or more hosts 106 where the hosts 106 may comprise computational devices.

The storage system 102 may include any storage system including those presently known in the art, such as a storage controller, a controller, a storage device, a storage subsystem, a storage unit, a computational device that includes or controls storage, etc. Data may be stored in the storage systems 102 in disks, tape, cd-roms, or any other storage media, including those presently known in the art.

The hosts 106 and the storage systems 102 may further comprise any suitable computational platform, including those presently known in the art, such as, personal computers, workstations, mainframes, midrange computers, network appliances, palm top computers, telephony devices, blade computers, laptop computers, etc. Embodiments may be implemented in a computing environments 100 that are based on a client-server paradigm. Alternative embodiments may be implemented in a peer-to-peer networked environment. The coupling of the hosts 106 to the storage system 102 may be direct or may be via any network 104 known in the art, such as a Storage Area Network (SAN), Local Area Network (LAN), Wide Area Network (WAN), the Internet, an Intranet, etc.

The storage system 102 includes unencrypted data 108, encrypted data 110, and an encryption management application 112. The unencrypted data 108 may also be referred to as legacy data. The unencrypted data 108 may have been stored in the storage system 102 before implementations of the embodiments are used to provide data security to the computing environment 100. The encrypted data 110 may also be referred to as non-legacy data, and the encrypted data 110 may be generated from the unencrypted data 108 by the encryption management application 112. While a single encryption management application 112 is shown, in alternative embodiments the operations performed by the encryption management application 112 may be performed by a plurality of applications.

The host 106 includes at least one host application 114 that may interact with the storage system 102 over the network 104. The host application 114 may attempt to access the unencrypted data 108 or the encrypted data 110 stored in the storage systems 102. The host application 114 may also attempt to write or update data to the storage systems 102. The host application 114 may also interact with the storage system 102 to perform other operations. Associated with the host application 114 may be an encryption key 116 and a decryption key 118, where the encryption key 116 may be used to encrypt unencrypted data 108 stored in the storage system 102 and the decryption key 118 may be used to decrypt encrypted data 110 stored in the storage system 102. In alternative embodiments, the encryption key 116 and the decryption key 118 may be stored outside the host 106.

In certain embodiments illustrated in FIG. 1, the encryption management application 112 avoids encrypting the unencrypted legacy data 108, at least until the time the encryption management application 112 receives a request to access the unencrypted legacy data 108.

Figure 2:
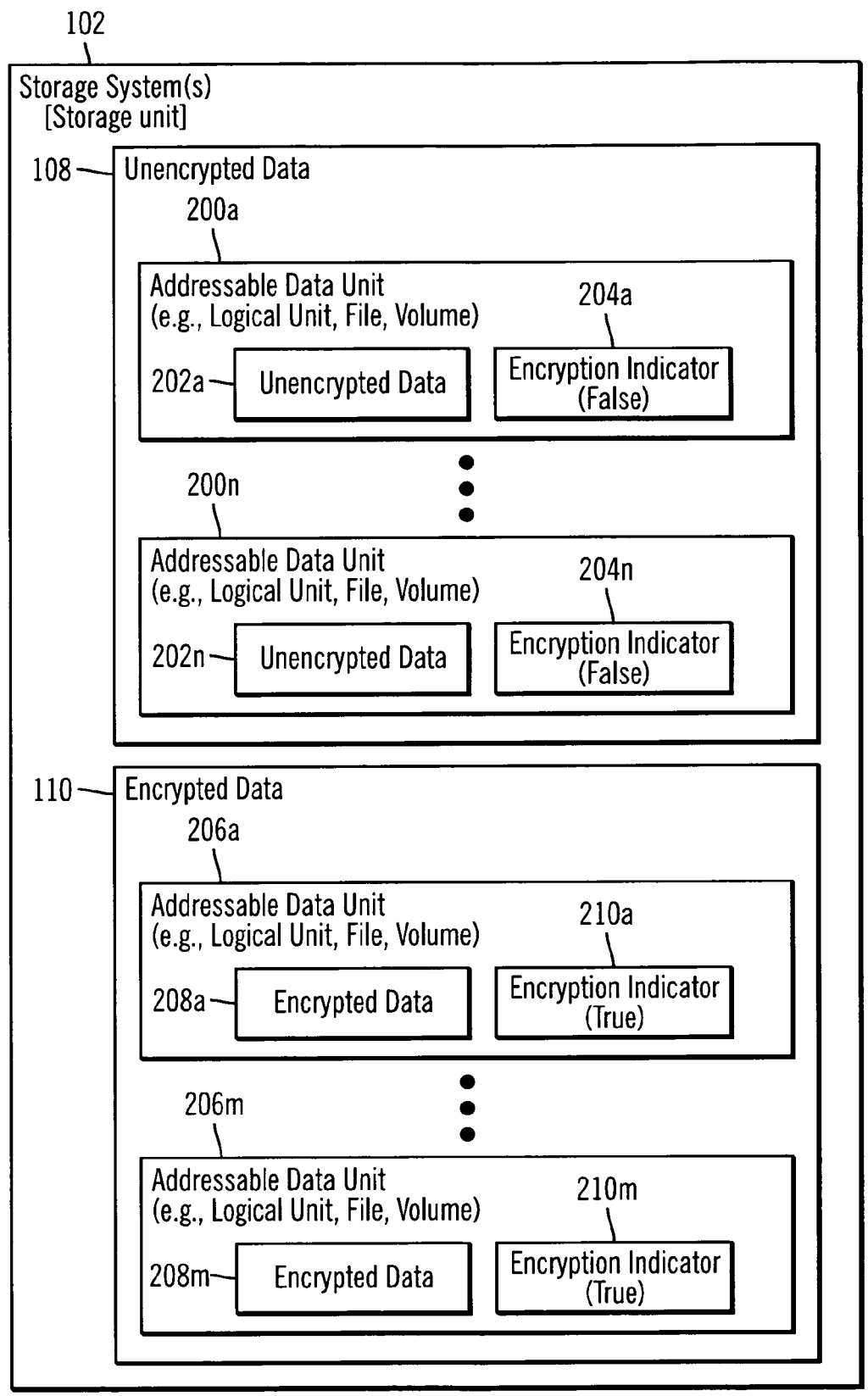
FIG. 2 illustrates data structures that represent data stored in storage systems, in accordance with certain embodiments.

FIG. 2 illustrates data structures that represent data stored the storage system 102, in accordance with certain embodiments. In alternative embodiments, other data structures may be used to represent the data stored in the storage system 102.

The unencrypted data 108 may be stored in a plurality of addressable data units 200a ... 200n, where the addressable data units 200a ... 200n may be logical units, files, volumes, or any other addressable units, and where an addressable unit is any unit of data that may be addressed by an application. The addressable data units 200a ... 200n may include unencrypted data 202a ... 202n and encryption indicators 204a ... 204n, where the encryption indicators 204a ... 204n may be set to false to indicate that the addressable data units 200a ... 200n store unencrypted data. For example, the addressable data unit 200a may include unencrypted data 202a and a corresponding encryption indicator 204a that is set to false indicates that data stored in the addressable data unit 200a is unencrypted.

The encrypted data 110 may be stored in a plurality of addressable data units 206a ... 206m, where the addressable data units 206a ... 206m may be logical units, files, volumes, or any other addressable units of data. For example, in certain embodiments, the plurality of addressable data units 200a ... 200n, 206a ... 206m are logical volumes, where the logical volumes are logical representations of physical volumes corresponding to physical storage coupled to the storage system 102. While data is physically stored in the physical volumes that comprise the physical storage, applications that execute on the storage systems 102, and the hosts 106 may address the logical volumes.

The addressable data units 206a ... 206m may include encrypted data 208a ... 208m and encryption indicators 210a ... 210m, where the encryption indicators 210a ... 210m may be set to true to indicate that the addressable data units 206a ... 206m store encrypted data. For example, the addressable data unit 206a may include encrypted data 208a and a corresponding encryption indicator 210a that is set to true indicates that data stored in the addressable data unit 206a is encrypted.

In FIG. 2, while the encryption indicators 204a ... 204n, 210a ... 210m are shown to be included in the unencrypted data 108 and encrypted data 110, in other embodiments the encryption indicators 204a ... 204n, 210a ... 210m may be stored separately from the unencrypted data 108 and encrypted data 110. In certain embodiments, the encryption indicators 204a ... 204n, 210a ... 210m may be stored in a bitmap that indicates which of the addressable data units 200a ... 200n, 206a ... 206m are storing unencrypted data and which of the addressable data units 200a ... 200n, 206a ... 206m are storing encrypted data.

In certain embodiments illustrated in FIG. 2, the encryption management application 112 may change the state of any of the addressable data units 200a ... 200n, by changing the unencrypted data 202a ... 202n from being unencrypted to encrypted and by updating the associated encryption indicators 204a ... 204n. For example, in certain embodiments, when the host application 114 attempts to access the unencrypted data 202a by addressing the addressable data unit 200a, the encryption management application 112 may encrypt the unencrypted data 202a and change the associated encryption indicator 204a to be true.

Figure 3:
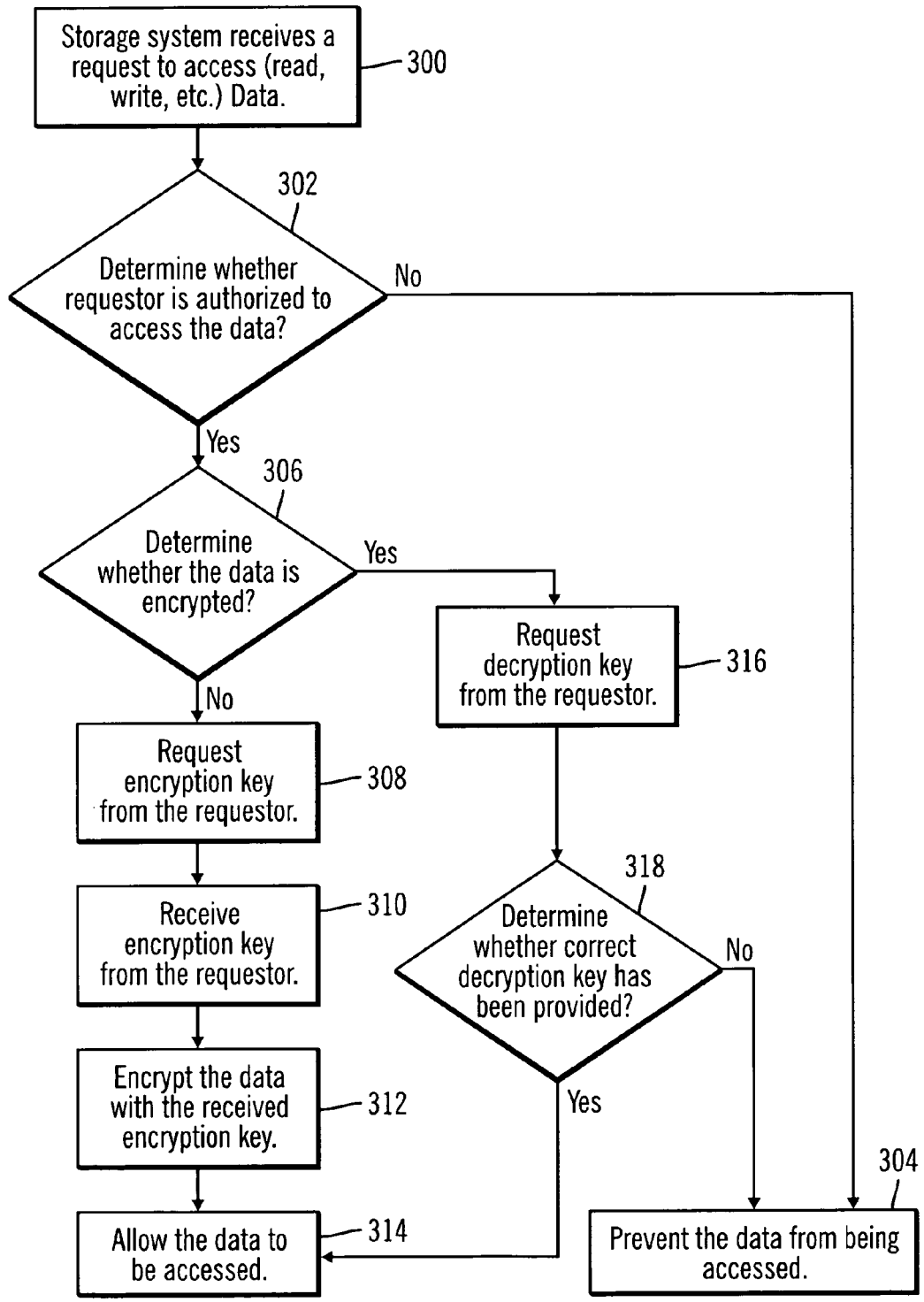
FIG. 3 illustrates a flowchart for encrypting unencrypted legacy data in response to a request to access the data, in accordance with certain embodiments.

FIG. 3 illustrates a flowchart for encrypting unencrypted legacy data 108 in response to a request to access the data, in accordance with certain embodiments. The operations illustrated in FIG. 3 may be implemented by the encryption management application 112 of the storage system 102.

Control starts at block 300, where encryption management application 112 of the storage system 102 receives a request from the host application 114, to access data stored in the storage system 102. The request from the host application 114 may be a request to read, write, update, or otherwise access the data stored in the storage system 102, wherein the data stored in the storage system 102 is either encrypted data 110 or unencrypted legacy data 108.

The encryption management application 112 determines (at block 302) whether the requestor, i.e., the host application 114, is authorized to access the data being requested. For example, the encryption management application 112 may determine from encryption indicator 204a ... 204n, 210a ... 210m of an addressable data unit 200a ... 200n, 206a ... 206m addressed by the host application 114, whether or not the data stored in the addressable data unit 200a ... 200n, 206a ... 206m is encrypted.

If the encryption management application 112 determines (at block 302) that the requestor, i.e., the host application 114, is not authorized to access the data being requested, then the encryption management application 112 prevents (at block 304) the requested data from being accessed by the host application 114.

If the encryption management application 112 determines (at block 302) that the requestor, i.e., the host application 114, is authorized to access the data being requested, then the encryption management application 112 determines (at block 306) whether the requested data is encrypted, by reading the value of the encryption indicator 204a . . . 204n, 210a . . . 210m corresponding to the requested data.

If the encryption management application 112 determines (at block 306) that the requested data is not encrypted, then in certain embodiments the encryption management application 112 requests an encryption key 116 to encrypt the unencrypted data 202a . . . 202n that is requested by the host application 114.

The encryption management application 112 receives (at block 310) the encryption key 116 from the host application 114, encrypts (at block 312) the unencrypted data with the encryption key 116 and updates the encryption indicator corresponding to the previously unencrypted data that has now been encrypted to true. Subsequently, the encryption management application 112 allows (at block 314) the requested data to be accessed by the host application 114. Therefore, in certain embodiments of the invention, when unencrypted legacy data is requested by the host application 114, the encryption management application 112 encrypts the requested unencrypted legacy data before providing access to the requested data to the host application 114. In certain alternative embodiments, the encryption key 116 may be obtained from applications that are different from the host application 114.

If the encryption management application 112 determines (at block 306) that the requested data is encrypted, then in certain embodiments the encryption management application 112 requests (at block 316) the decryption key 118 to decrypt the unencrypted data 202a . . . 202n that is requested by the host application 114. On receiving a response to the request for the decryption key 118 from the host application 114, the encryption management application 112 determines (at block 318) whether the correct decryption key 118 has been provided. If so, then the encryption management application 112 allows (at block 314) the requested data to be accessed by the host application 114 by decrypting the encrypted data with the provided decryption key 118. If the encryption management application 112 determines (at block 318) that the correct decryption key 118 has not been provided, then the encryption management application prevents (at block 304) the requested data from being accessed.

Therefore, FIG. 3 illustrates certain embodiments in which the storage system 102 maintains unencrypted legacy data in the storage system 102. When a request for unencrypted legacy data arrives at the storage system 102 from an authorized entity, then the encryption management application 112 encrypts the unencrypted data before allowing access to the requested data. Immediate encryption of data is implemented in the embodiments, even though unencrypted legacy data 108 is still maintained in the storage system 102.

Figure 4:
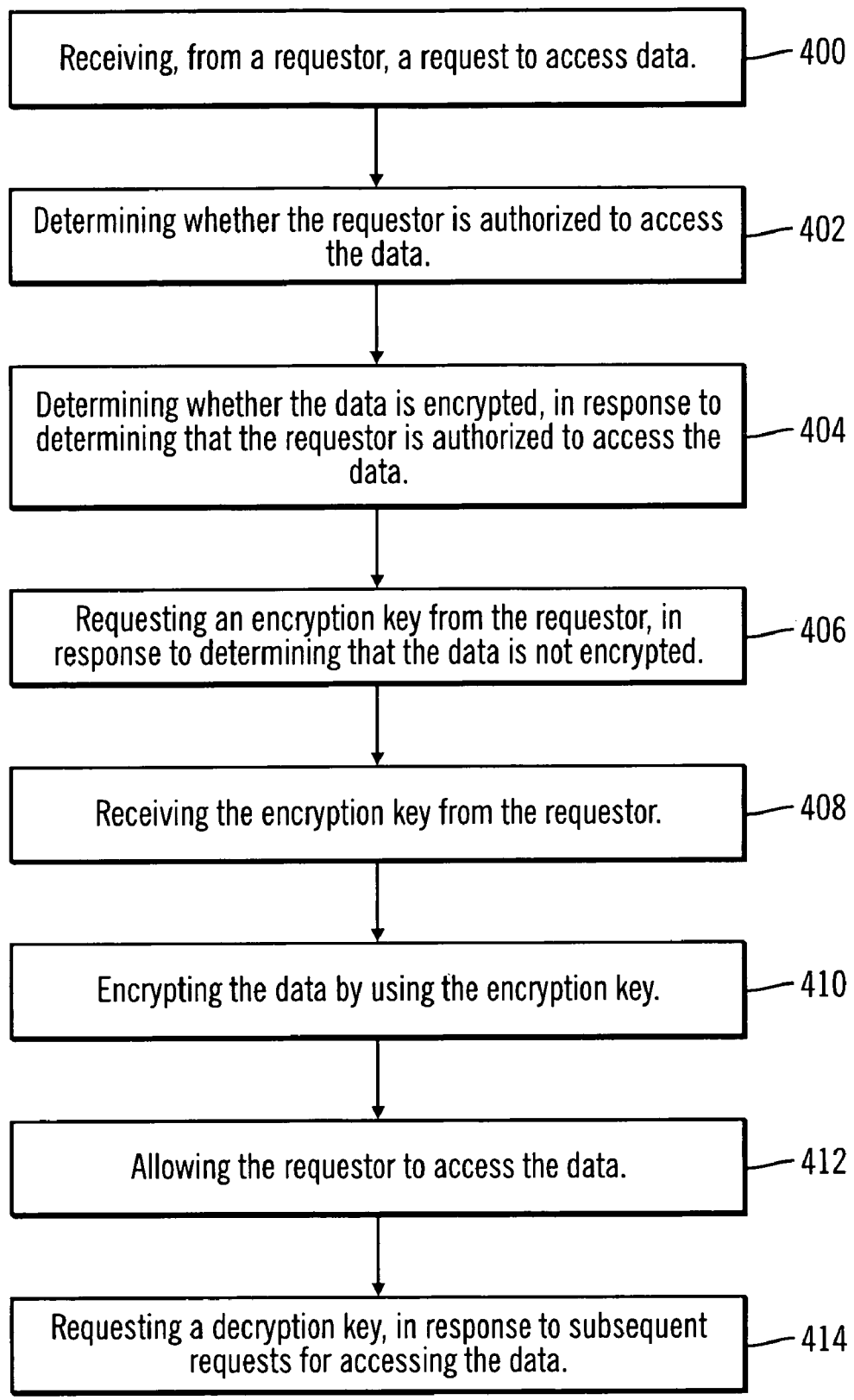
FIG. 4 illustrates a flowchart for the encryption of data in storage systems, in accordance with certain embodiments.

FIG. 4 illustrates a flowchart for the encryption of data in storage systems 102, in accordance with certain embodiments. The operations illustrated in FIG. 4 may be implemented by the encryption management application 112 of the storage system 102.

Control starts at block 400, where the encryption management application 112 receives from a requestor 114 a request to access data stored in the storage system 102. The encryption management application 112 determines (at block 402) whether the requestor 114 is authorized to access the requested data. The encryption management application 112 determines (at block 404) whether the requested data is encrypted, in response to determining that is requestor 114 is authorized to access the requested data.

At block 406, the encryption management application 112 requests an encryption key 116 from the requester 114, in response to determining that the requested data is not encrypted. The encryption management application 112 receives (at block 408) the encryption key 116 from the requestor 114 and encrypts (at block 410) the requested data with the received encryption key 116. The encryption management application 112 allows (at block 412) the requestor 114 to access the requested data that has now been encrypted, where the data that has now been encrypted is referred to as encrypted data 110.

In response to subsequent requests for accessing the encrypted data 110, the encryption management application 112 requests (at block 414) the decryption key 118 and allows access to the now encrypted data 110 if the correct decryption key 118 is provided.

Therefore, FIG. 4 illustrates certain embodiments in which an addressable unit of unencrypted legacy data continues to be maintained on a storage system 102, at least until the time a request to access the addressable unit of unencrypted legacy data is received at the storage system 102. On receiving the request to access the addressable unit of unencrypted legacy data, the addressable unit of unencrypted legacy data is encrypted.

In certain embodiments, immediate data encryption can be provided at the common access point to a data level. In certain embodiments, such immediate data encryption can be provided in a storage subsystem for all data that resides within that storage subsystem at multiple levels of granularity (e.g., at the entire subsystem, logical subsystem, volumes, extent, record/block, or byte level). In certain embodiments, all access to data in the storage subsystem may pass through the upper interfaces of the storage subsystem encryption mechanism. Then over time as all data within that subsystem is rewritten. In certain embodiments, the common access point as represented by the storage subsystem can also reside in other 'common' access points that may be configured in a specific customer configuration. For example, a switch or appliance located in the SAN, a virtualization layer, a channel/fibre or logical volume manager, etc., may be used to implement the immediate data encryption.

In certain alternative embodiments, the encryption keys 116 can be set up through a secured interface into the storage subsystem 102, such as a storage maintenance console, at various layers (entire subsystem, LSS, volume, record/block or even byte). Multiple encryption layers with different encryption 'access' keys can also be set up in this manner. Such embodiments may provide multiple layers of security access to data behind a particular storage subsystem, then within a specific logical storage subsystem, then within a specific volume or logical unit, and then within a specific track/sector, record/block or even byte of data. Existing software security packages can then be modified to provide encryption keys based on the external user's security profile. The software security package could use the existing security programming interfaces extending those interfaces to provide the appropriate encryption keys.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD- ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
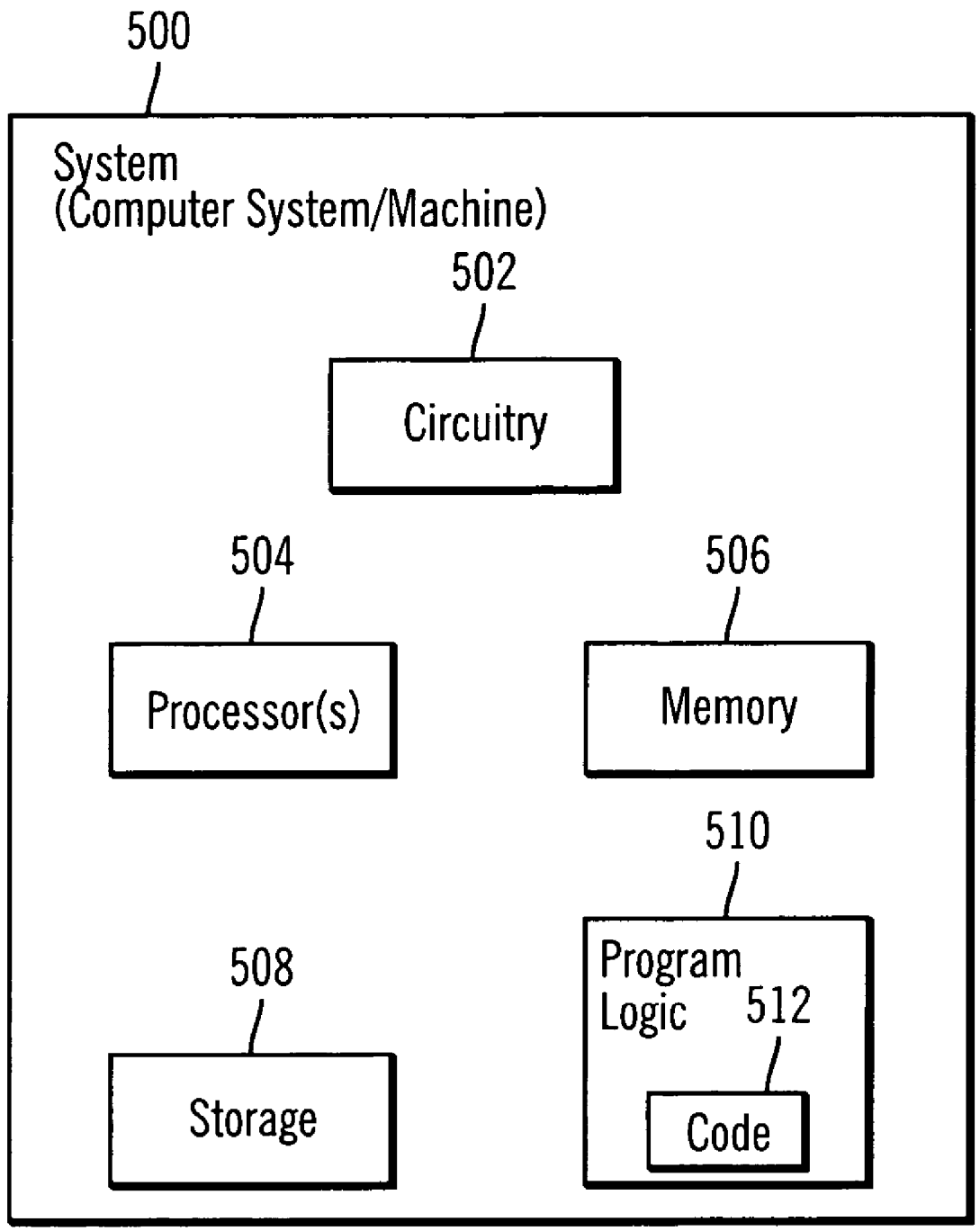
FIG. 5 illustrates the architecture of computing system, wherein in certain embodiments the storage system or the computational device of the computing environment of FIG. 1 may be implemented in accordance with the architecture of the computing system.

FIG. 5 illustrates a block diagram of the architecture of a system 500 in which certain embodiments may be implemented. In certain embodiments, the storage system 102, and the host 106 shown in FIG. 1, may be implemented in accordance with the system 500. The system 500 may include a circuitry 502 that may in certain embodiments include a processor 504. The system 500 may also include a memory 506 (e.g., a volatile memory device), and storage 508. Certain elements of the system 500 may or may not be found in the storage system 102 and the hosts 106. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 3 and 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving, by a computational device, a request to access data from a requestor, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state;

determining, by the computational device, that the requestor is authorized to access the data;

determining, by the computational device, that the data is not encrypted, in response to determining that the requestor is authorized to access the data;

requesting, by the computational device, an encryption key from the requestor, in response to determining that the data is not encrypted;

receiving the encryption key from the requestor;

encrypting the data by using the encryption key; and migrating all legacy data stored in the storage unit to encrypted data stored in the storage unit over an extended period of time.

2. The method of claim 1, further comprising:

requesting a decryption key from the requester, in response to subsequent requests for accessing the data, wherein the requestor is a host application that executes in a host that is coupled to the computational device, and wherein the host has both the encryption key and the decryption key.

3. The method of claim 1, wherein the request to access the data is made by addressing a logical unit, a file, a byte, a record, a block, a volume or an entire subsystem that includes the data.

4. A system, comprising:

memory; and processor coupled to the memory, wherein the processor executes:

receiving, from a requestor, a request to access data, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state;

determining that the requestor is authorized to access the data;

determining that the data is not encrypted, in response to determining that the requestor is authorized to access the data;

requesting an encryption key from the requestor, in response to determining that the data is not encrypted;

receiving the encryption key from the requestor;

encrypting the data by using the encryption key; and migrating all legacy data stored in the storage unit to encrypted data stored in the storage unit over an extended period of time.

5. The system of claim 4, wherein the processor further executes:

requesting a decryption key from the requestor, in response to subsequent requests for accessing the data, wherein the requestor is a host application that executes in a host that is coupled to the computational device, and wherein the host has both the encryption key and the decryption key.

6. The system of claim 4, wherein the request to access the data is made by addressing a logical unit, a file, a byte, a record, a block, a volume or an entire subsystem that includes the data.

7. A system, comprising:

a processor;

a host; and a storage subsystem having the processor, wherein the storage subsystem receives from the host a request to access data, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state, wherein the storage subsystem determines that the host is authorized to access the data, wherein the storage subsystem determines that the data is not encrypted, in response to determining that the host is authorized to access the data, wherein the storage subsystem requests an encryption key, in response to determining that the data is not encrypted, wherein the storage subsystem receives the encryption key from the host, wherein the storage subsystem encrypts the data by using the encryption key, and wherein the storage subsystem migrates all legacy data stored in the storage unit to encrypted data stored in the storage unit over an extended period of time.

8. The system of claim 7, wherein the storage system further performs:

requesting a decryption key from the host, in response to subsequent requests for accessing the data, and wherein the host has both the encryption key and the decryption key.

9. The system of claim 7, wherein the request to access the data is made by addressing a logical unit, a file, a byte, a record, a block or a volume.

10. A computer readable storage medium, wherein code stored in the computer readable storage medium when executed by a machine causes operations, the operations comprising:

receiving, from a requestor, a request to access data, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state;

determining that the requestor is authorized to access the data;

determining that the data is not encrypted, in response to determining that the requestor is authorized to access the data;

requesting an encryption key from the requestor, in response to determining that the data is not encrypted;

receiving the encryption key from the requestor;

encrypting the data by using the encryption key; and migrating all legacy data stored in the storage unit to encrypted data stored in the storage unit over an extended period of time.

11. The computer readable storage medium of claim 10, the operations further comprising:

requesting a decryption key from the requestor, in response to subsequent requests for accessing the data, wherein the requestor is a host application that executes in a host that is coupled to the computational device, and wherein the host has both the encryption key and the decryption key.

12. The computer readable storage medium of claim 10, wherein the request to access the data is made by addressing a logical unit, a file, a byte, a record, a block, a volume or an entire subsystem that includes the data.

13. A method for deploying computer infrastructure, comprising integrating computer-readable code into a controller, wherein the code in combination with the controller performs:

receiving, by the controller, a request to access data from a requestor, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state;

determining, by the controller, that the requestor is authorized to access the data;

determining, by the controller, that the data is not encrypted, in response to determining that the requestor is authorized to access the data;

requesting, by the controller, an encryption key from the requestor, in response to determining that the data is not encrypted;

receiving the encryption key from the requestor;

encrypting the data by using the encryption key; and migrating all legacy data stored in the storage unit to encrypted data stored in the storage unit over an extended period of time.

14. The method of claim 13, wherein the code in combination with the controller performs:

requesting a decryption key from the requestor, in response to subsequent requests for accessing the data, wherein the requestor is a host application that executes in a host that is coupled to the computational device, and wherein the host has both the encryption key and the decryption key.

15. The method of claim 13, wherein the request to access the data is made by addressing a logical unit, a file, a byte, a record, a block, a volume or an entire subsystem that includes the data.

16. A system, comprising:

a processor;

means for receiving, by the processor, a request to access data from a requestor, wherein the data is legacy data that is stored in a storage unit, wherein the legacy data is pre-existing data, wherein the legacy data is stored in the storage unit in an unencrypted state at least until the time an attempt is made to access the legacy data, and wherein data that is not legacy data is stored in the storage unit in an encrypted state;

means for determining, by the processor, that the requestor is authorized to access the data;

means for determining, by the processor, that the data is not encrypted, in response to determining that the requestor is authorized to access the data;

means for requesting, by the processor, an encryption key from the requestor, in response to determining that the data is not encrypted;

means for receiving the encryption key from the requestor;

means for encrypting the data by using the encryption key; and means for migrating all legacy data stored in the storage unit to encrypted data stored in the storage unit over an extended period of time.

17. The system of claim 16, further comprising:

means for requesting a decryption key from the requestor, in response to subsequent requests for accessing the data, wherein the requestor is a host application that executes in a host that is coupled to the computational device, and wherein the host has both the encryption key and the decryption key.

18. The system of claim 16, wherein the request to access the data is made by addressing a logical unit, a file, a byte, a record, a block, a volume or an entire subsystem that includes the data.

* * * * *